United States Patent
Jenkins et al.

(10) Patent No.: US 10,616,378 B2
(45) Date of Patent: Apr. 7, 2020

(54) ADAPTIVE SESSION INTELLIGENCE EXTENDER

(71) Applicant: NetScout Systems, Inc., Westford, MA (US)

(72) Inventors: Catherine Jenkins, Leominster, MA (US); Jinfeng Wang, Jericho, NY (US); Ted Thompson, Litchfield, NH (US); Kok Pheng Tay, Singapore (SG)

(*) Notice: Subject to any disclaimer, the term of this patent is extended or adjusted under 35 U.S.C. 154(b) by 168 days.

(21) Appl. No.: 15/438,087

(22) Filed: Feb. 21, 2017

(65) Prior Publication Data

US 2018/0241648 A1    Aug. 23, 2018

(51) Int. Cl.
| | |
|---|---|
| G06F 15/173 | (2006.01) |
| H04L 29/06 | (2006.01) |
| G06F 11/34 | (2006.01) |
| G06F 9/46 | (2006.01) |
| H04L 29/08 | (2006.01) |
| H04L 12/24 | (2006.01) |
| H04L 12/26 | (2006.01) |
| G06F 11/30 | (2006.01) |

(52) U.S. Cl.
CPC .......... H04L 69/16 (2013.01); G06F 9/466 (2013.01); G06F 11/3409 (2013.01); H04L 69/02 (2013.01); H04L 69/329 (2013.01); G06F 11/3006 (2013.01); G06F 2201/87 (2013.01); H04L 41/5009 (2013.01); H04L 41/5067 (2013.01); H04L 43/18 (2013.01); H04L 67/22 (2013.01)

(58) Field of Classification Search
CPC ..... H04L 41/5009; H04L 43/04; H04L 43/08; H04L 69/16; H04L 69/329; H04L 43/028; H04L 67/22; H04L 69/02; G06F 2201/87

USPC ....... 709/203, 213, 223, 224, 226, 227, 229, 709/246, 252; 370/235, 252, 389, 392; 714/4.3, 13, 45, 57

See application file for complete search history.

(56) References Cited

U.S. PATENT DOCUMENTS

| | | | |
|---|---|---|---|
| 7,072,800 B1 | 7/2006 | Fernandez et al. | |
| 2002/0169860 A1* | 11/2002 | Duggan | H04L 29/06 709/223 |
| 2003/0191989 A1* | 10/2003 | O'Sullivan | H04L 41/0631 714/47.2 |

(Continued)

FOREIGN PATENT DOCUMENTS

| | | |
|---|---|---|
| EP | 0957432 A2 | 11/1999 |
| WO | WO-9844418 A1 | 10/1998 |

OTHER PUBLICATIONS

Copy of Extended European Search Report for European Patent Application No. 18157560.6, dated Jul. 9, 2018.

*Primary Examiner* — Dustin Nguyen
*Assistant Examiner* — Hao H Nguyen
(74) *Attorney, Agent, or Firm* — Locke Lord LLP; Scott D. Wofsy; Christopher J. Capelli (57) ABSTRACT

A method for monitoring performance of customized applications at transaction level in a computer network is provided. The method includes receiving, from a user, information related to a customized application. The received information includes at least an application definition and information related to customized application protocol. A template is generated for the customized application based on the received information. Performance of the customized application is monitored at transaction level using the generated template.

18 Claims, 5 Drawing Sheets

(56) References Cited

U.S. PATENT DOCUMENTS

| | | | |
|---|---|---|---|
| 2004/0068560 A1 | 4/2004 | Oulu et al. | |
| 2006/0111956 A1* | 5/2006 | Whitesage | G06Q 10/063 705/7.29 |
| 2007/0263541 A1* | 11/2007 | Cobb | H04L 41/5003 370/235 |
| 2007/0266148 A1* | 11/2007 | Ruiz | H04L 41/5038 709/224 |
| 2009/0028144 A1* | 1/2009 | Blair | H04L 43/18 370/389 |
| 2009/0150908 A1* | 6/2009 | Shankaranarayanan | G06F 9/466 719/320 |
| 2009/0164270 A1* | 6/2009 | Seidman | G06Q 10/06 705/7.38 |
| 2009/0216874 A1* | 8/2009 | Thain | G06Q 10/10 709/224 |
| 2009/0271511 A1* | 10/2009 | Peracha | G06F 11/3419 709/224 |
| 2010/0177650 A1* | 7/2010 | Wittgreffe | H04L 41/5009 370/252 |
| 2015/0199254 A1* | 7/2015 | Vesepogu | G06F 11/3466 717/130 |
| 2016/0034355 A1* | 2/2016 | Sadovsky | G06F 11/142 714/4.3 |
| 2016/0314033 A1* | 10/2016 | Polychronis | G06F 11/079 |
| 2017/0126516 A1* | 5/2017 | Tiagi | H04L 43/04 |
| 2019/0102401 A1* | 4/2019 | Neel | G06F 11/2023 |

* cited by examiner

| Label | Value | Offset | Length | Format |
|---|---|---|---|---|
| Message | Shopping Cart | 8-31 | 16 | ASCII |
| MSG Request | 0100 | 48 | 4 | ASCII |
| MSG Respond | 0110 | 48 | 4 | ASCII |
| Transaction ID | 1234567890123456 | 32 | 16 | ASCII |

ADAPTIVE SESSION INTELLIGENCE EXTENDER

FIELD OF THE INVENTION

This specification is directed, in general, to computer networks, and, more particularly, to Adaptive Session Intelligence (ASI) extender.

BACKGROUND OF THE INVENTION

In today's highly competitive telecommunications industry, service providers provide customers (subscribers) with a wide variety of voice, data, video, and internet services. Rapid application development and deployment within enterprise have become a reality with the help of ever growing AaaS/PaaS/SaaS markets and richness of development toolkits. Providing in-time monitoring on these new applications becomes a challenge to service providers.

Typically, if a customer would like to see performance data for a particular protocol, the customer would need to provide the specification for the protocol to a network monitoring application. However, various customers may have developed their own proprietary protocols or may be using third party protocols for which the specification cannot be provided. Accordingly, it would be advantageous to provide a monitoring and troubleshooting process capable of probing proprietary, fixed format, protocols.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a method and system for monitoring performance of customized applications at transaction level in a computer network is provided. The method includes receiving, from a user, information related to a customized application. The received information includes at least an application definition and information related to customized application protocol. A template is generated for the customized application based on the received information. Performance of the customized application is monitored at transaction level using the generated template.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present invention is now described more fully with reference to the accompanying drawings, in which illustrated embodiments of the present invention is shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may differ from the actual publication dates which may need to be independently confirmed.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer usable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

A communication network is a geographically distributed collection of nodes interconnected by communication links and segments for transporting data between end nodes, such as smart phones, pads, personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

Embodiments of the present invention relate to monitoring performance of customized applications at transactional level in a computer network. To monitor performance of customized applications at transactional level, a plurality of devices dedicated to monitoring data that pertains to the customized application transaction needs to have the understanding of integral components of each transaction such as, but not limited to, transaction request messages, transaction response messages and associated transaction status and error codes. In one exemplary embodiment, to provide application insights, the plurality of monitoring devices utilizes an Adaptive Session Intelligence (ASI) adaptor for storage and processing. ASI data set provides the analysis granularity required to extract rich network, service- and user-related metrics on devices, subscribers, base station ID, Location Area (LA), Routing Area (RA), QoS, SITE, Access Point Name (APN), Tracking Area Code (TAC), and VLAN. Each record in the ASI data set may be updated in real-time and made available during a session and/or after the termination of the session. Depending on protocols, utilization of these special ASI adaptors enables the plurality of monitoring devices to continuously monitor and troubleshoot customized applications at transaction level in addition to at application throughput and TCP/UDP transport level. Fixed format protocol is a protocol, such as a TCP/IP protocol or a UDP/IP protocol in which each transaction type has a fixed transaction length and a fixed offset. Hence, the network monitoring system can facilitate more efficient and effective troubleshooting triage by matching error codes to corresponding server(s) performing corresponding transactions, for example.

Overview of System Architecture

Figure 1:
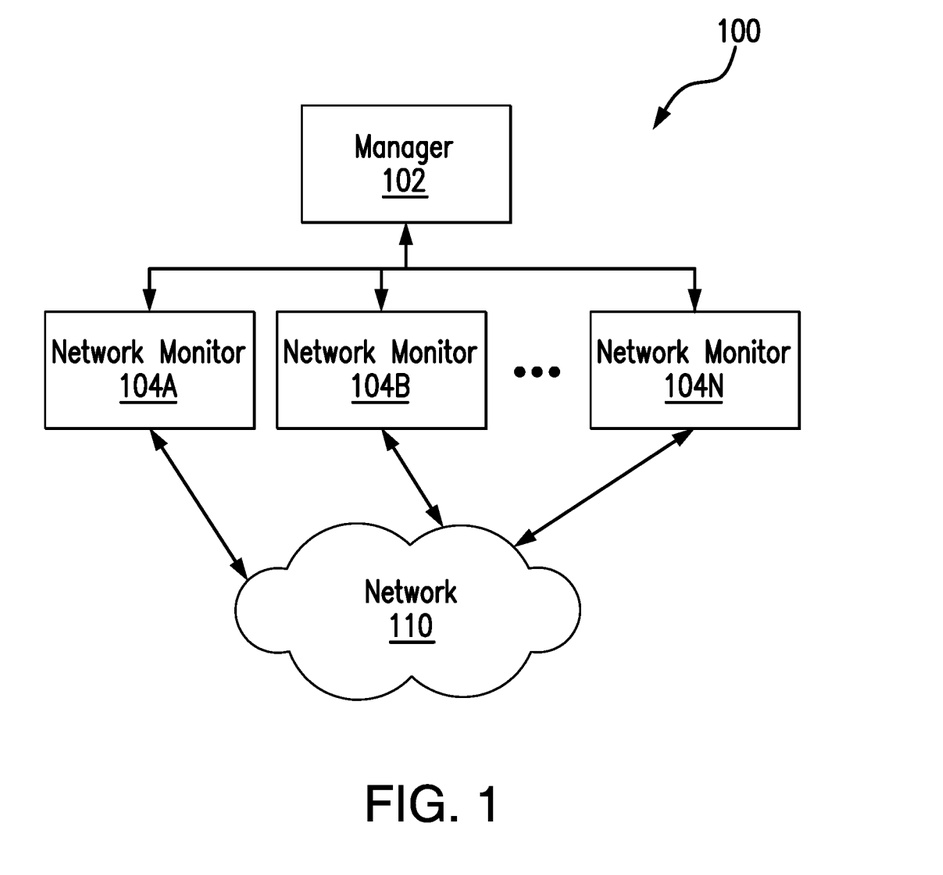
FIG. 1 illustrates the architecture of a system for monitoring network applications, according to one embodiment of the present invention.

FIG. 1 illustrates architecture of a system 100 for monitoring network applications, according to one embodiment of the present invention. The network system 100 may include, among other components, a manager 102, one or more network monitors 104A through 104N (hereinafter collectively referred to as "the network monitors 104") and a network 110. The network monitors 104 are connected to the network 110 to monitor network data packets traversing at certain locations or links of the network 110. The locations or the links connected to the network monitors 104 are preferably critical or important locations of the network 110.

The manager 102 is connected to the network monitors 104 to set various operating parameters. Although the manager 102 is illustrated as being directly connected to the network monitors 104, the manager 102 may communicate with the network monitors 104 via the network 110 or other networks. The network monitors 104 may be located remotely from the manager 102. Alternatively, the manager 102 may be co-located with one of the network monitors 104 or embodied in one of the network monitors 104.

The operating parameters set by the manager 102 may include, among others, information related to a customized application, the format of the customized application protocol, and lengths of time the ASI data set pertaining to the customized application should be stored. The performance information stored in the ASI data set may be set per application-by-application basis, for example.

The manager 102 is hardware, software, firmware or a combination thereof for managing the operation of the network monitors 104. The manager 102 may perform one or more of the following functions: (i) process information based on ASI data set, (ii) receive parameters from a user for setting the operation of the network monitors 104, (iii) send commands to the network monitors 104 to set parameters or preferences for their operations s, (iv) present the collected information to the user, (v) generate reports concerning transaction status and/or performance of the customized network applications, (vi) analyze various transactions based on information received from the network monitors 104 to resolve issues at transactional level in the network 110, and (vii) provide information about user experience associated with the customized application (e.g., application response time).

The manager 102 may be embodied as a general purpose computing device installed with specialized software for performing one or more of these operations. Alternatively, the manger 102 is embodied as a specialized computing device. In one embodiment, the manager 102 is a computing device running nGenius One, available from NetScout Systems, Inc. of Westford, Mass.

In one embodiment, the manager 102 receives ASI data sets or selectively accesses ASI data sets from the network monitors 104, analyzes or correlates the data sets, and produces multi-source information useful for end to end visibility of a customized application and other purposes. ASI data set comprises highly scalable metadata that enables a comprehensive real-time and historic view of service, network, application, and server performance.

The network monitors 104 are hardware, software, firmware or a combination thereof for monitoring network application communication at various locations or links of the network 110. Each of the network monitors 104 may be deployed at certain locations or links of the network 110 to collect transactional data traversing the locations or links.

As described in greater detail below, to address customers' ever changing challenges, after collecting information related to one or more monitored transaction based applications, the network monitors 104 generate a template based on the received application protocol specific data, monitors performance of the customized application using the generated template and stores the ASI data pertaining to the monitored application. In one embodiment, the template is generated in real-time and sent to the manager 102. In another embodiment, the template is stored as a file in the network monitors 104 and then sent to the manager 102 at a later time. The network monitors 104 may also store the generated ASI data in addition to the application-specific templates. In one embodiment, the ASI data set related to one or more monitored transaction based applications are retained in the network monitor 104 for a longer time compared to other ASI data.

At least in some embodiments, the network monitor 104 may also support data extraction function that allows its user to identify and retrieve one or more selected data fields from one or more transactions. The network monitor 104 may include a data extractor module similar to or the same as an ASI extender 214, described below in greater detail. The multi-source information is obtained by processing ASI data sets from multiple sources, and hence, may represent overall condition or state of a particular transactional application or a state of a particular transaction associated with a customized application. The data extractor module maps transactions of the same application or different applications based on application definition or other information related to customized application protocol.

The extraction of user-specified data (such as, for example, the stockID and the amount fields in a financial application) or other information from the analyzed transactions may require extensive resources. In one embodiment, therefore, a data extractor module, separate from the network monitor 104, may be provided to perform data extraction. The data extractor may co-exist on the same hardware as the network monitor 104 or be included in hardware separate from the network monitor 104. The data extractor module may be located in the same geographical area as the network monitor 104 or at a location remote from the network monitor 104. Further, more than one data extractor may be connected to extract data fields or other transactional information received from a subset of network monitors.

The network monitor 104 may be a special purpose computing device or a software component (not limited to a single process) dedicated to monitoring data communicated via the network 110. Alternatively, the network monitor 104 may be a general purpose computing device with specialized software components installed thereon. In one embodiment, the network monitor 104 is embodied as nGenius Collectors, nGenius Probes or nGenius InfiniStream, available from NetScout Systems, Inc. of Westford, Mass.

The network 110 may include a cellular network, a local area network (LAN), a wide area network (WAN) (e.g., the Internet) and/or any other interconnected data path across which multiple devices may communicate. The network 110 may include various network devices hosting different applications operating at different levels of protocols.

Example Architecture of Manager/Network Monitor

Figure 2:
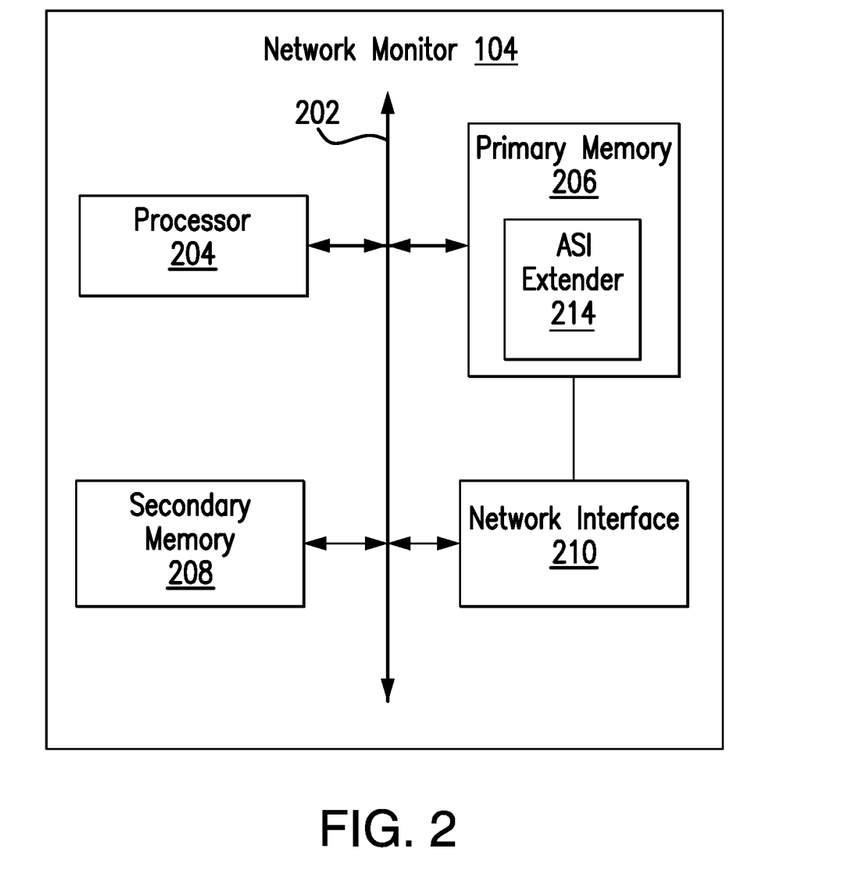
FIG. 2 is a block diagram of the network monitor of FIG. 1, according to one embodiment of the present invention.

FIG. 2 is a block diagram of the network monitor 104, according to one embodiment of the present invention. The network monitor 104 may include, among other components, a processor 204, primary memory 206, secondary memory 208, and a network interface 210. These components are connected and communicate via a bus 202. The network monitor 104 may also include other components not illustrated in FIG. 2, such as user input devices (e.g., keyboard and mouse) and display devices (e.g., a display driver card).

The processor 204 executes computer instructions stored in the primary memory 206 and/or the secondary memory 208. Although only a single processor is illustrated in FIG. 2, two or more processors may be used to increase the computing capacity and the processing speed of the network monitor 104.

The primary memory 206 is a computer readable storage medium that stores, among other data, computer instruction modules for processing, storing and retrieving transactional network data and/or ASI data sets. The primary memory 206 may be implemented in various data storage devices (e.g., Random-Access Memory (RAM)) having a faster access speed compared to the secondary memory 208. The faster access speed of the primary memory 206 allows the network monitor 104 to analyze transactional data and generate application-specific ASI data sets in real-time or near real-time.

The secondary memory 208 may be a secondary storage device for storing, among others, the generated templates and the generated ASI data sets. The secondary memory 208 may be embodied, for example, as a solid-state drive, hard disk or other memory devices capable of storing a large amount of data compared to the primary memory 206.

The network interface 210 may include a NIC (network interface card) or other standard network interfaces to receive captured network data packets, and to communicate with other network interface devices coupled to the network 110. For example, the network interface 210 may be an Ethernet interface, a WiFi (IEEE 802.11) interface, or other types of wired or wireless network interfaces. In one embodiment, two or more network interfaces are used to communicate with different types of network applications or perform specialized functions.

In one embodiment, the network interface 210 sends the transactional data directly to the ASI extender 214. The network interface 210 may send one set of the transactional data packets to the ASI extender 214 for processing the transactions and another set of transactional data for storing in the secondary memory 208. Alternatively, the network interface 210 may send the transactional data to the ASI extender 214 and not to the secondary memory 208. That is, the ASI extender 214 receives the transactional data from the network interface 210, processes the received data using one or more pre-generated application specific template(s), generates corresponding ASI data sets, and sends the transactional data and/or the generated ASI data sets to the secondary memory 208. By receiving the transactional data directly from the network interface 210, the ASI extender 214 can process the transactional data at a high speed without delays associated with accessing the secondary memory 208.

Although FIG. 2 describes the network monitor 104 as including the ASI extender 214, the manager 102 may also include the ASI extender 214 or select components of the ASI extender 214 to process application-specific transactional data received at the network monitor 104. In one embodiment, the network monitor 104 and the manager 102 both include the ASI extender 214.

Figure 3:
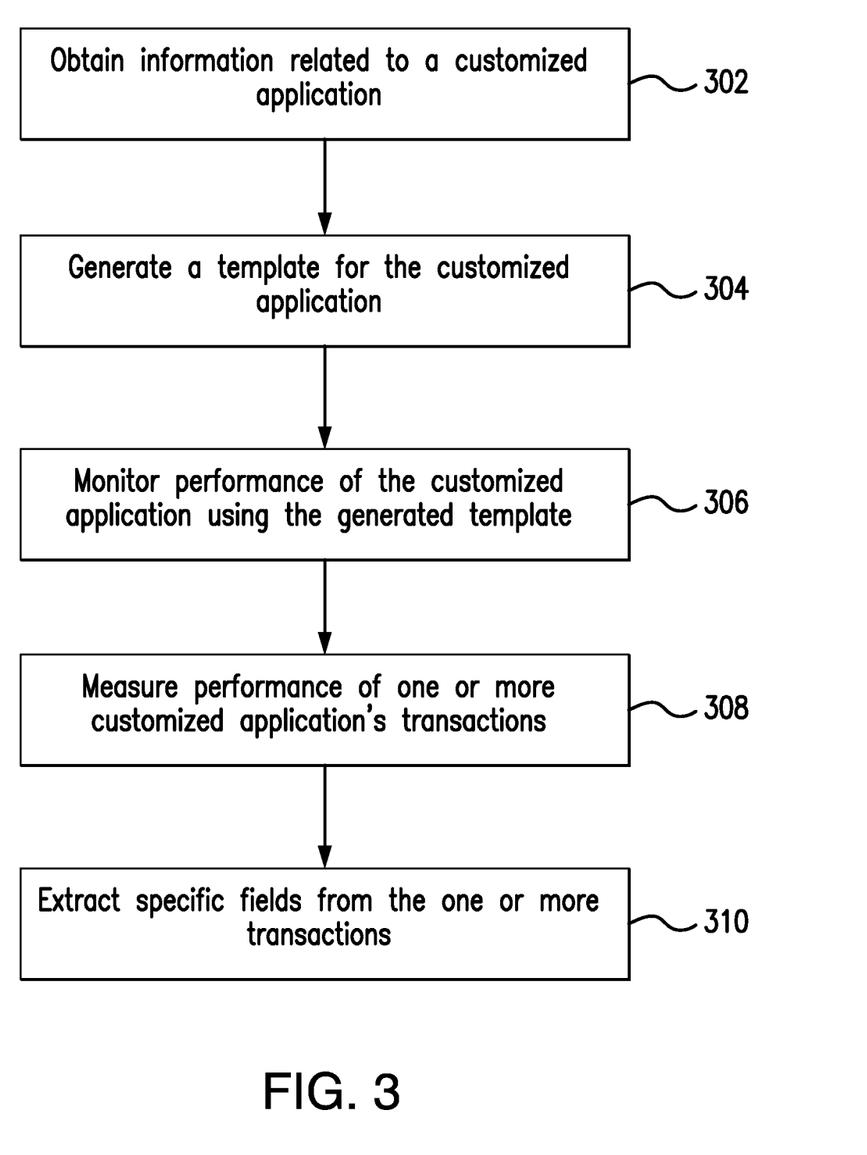
FIG. 3 is a flowchart illustrating a method for monitoring performance of customized applications in a computer network, in accordance with illustrative embodiments of the present invention.

FIG. 3 is a flowchart illustrating a method for monitoring performance of customized applications in a computer network, in accordance with illustrative embodiments of the present invention. Before turning to description of FIG. 3, it is noted that the flow diagrams shown therein are described, by way of example, with reference to components shown in FIGS. 1 and 2, although these operational steps may be carried out in any system and are not limited to the scenario shown in the aforementioned figure. Additionally, the flow diagram in FIG. 3 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

In order to collect ASI performance metrics data for a given customized application the network monitor 104 needs to understand the structure and content of the application's primary transactions. According to embodiments of the present invention, advantageously, the ASI extender 214 is configured to provide users end to end visibility of customized applications that typically do not have full ASI data support. The ASI extender 214 may utilize results of a multi-stage definition process during configuration. In one embodiment this multi-stage definition process provides at least an application definition and additional information related to a customized application protocol.

Accordingly, at step 302, the ASI extender 214 obtains information from a user related to a customized application of interest using, for example, a Graphical User Interface (GUI). The obtained information includes an application definition. In one embodiment, the application definition provides network layer, transport layer, as well as payload data field identifier configurations. The network layer transfers variable length data sequences (i.e., datagrams) from one node to a next node in a network. The network layer provides mechanisms for routing messages in the network. With respect to the network and transport layers, the application definition may comprise the destination IP address and the destination port number (or the range of destination ports). Optionally, the customized application may be defined as the source IP address and the source port combination. For example, an application to be monitored may be defined as any of the following:

10.10.10.1, TCP 10001 (Server IP address, Server Port number)
    10.10.10.1, 10.10.20.1, TCP 100001 (Server IP address, Client IP address, Server Port number)
    10.10.10.1, 10.10.20.1, TCP 100001, TCP 10101 (Server IP address, Client IP address, Server Port number, Client Port number)
    10.10.20.1/28, TCP 10002-10010, 10030 (Server IP address/Server Port number range)

In addition to IP address and port number, customized applications may require additional string for identification of the payload associated with a particular customized application. According to an embodiment, the ASI extender 214 is configured to monitor applications that require string match at a fixed position or with limited sliding match. For payload string identification matching the example required entries stored by the ASI extender 214 can be:

Application Identification String
    String length
    String format (e.g., binary, decimal, ASCII, EBCDIC, HEX)
    Starting offset within payload
    Sliding search range (optional)

Figure 4:
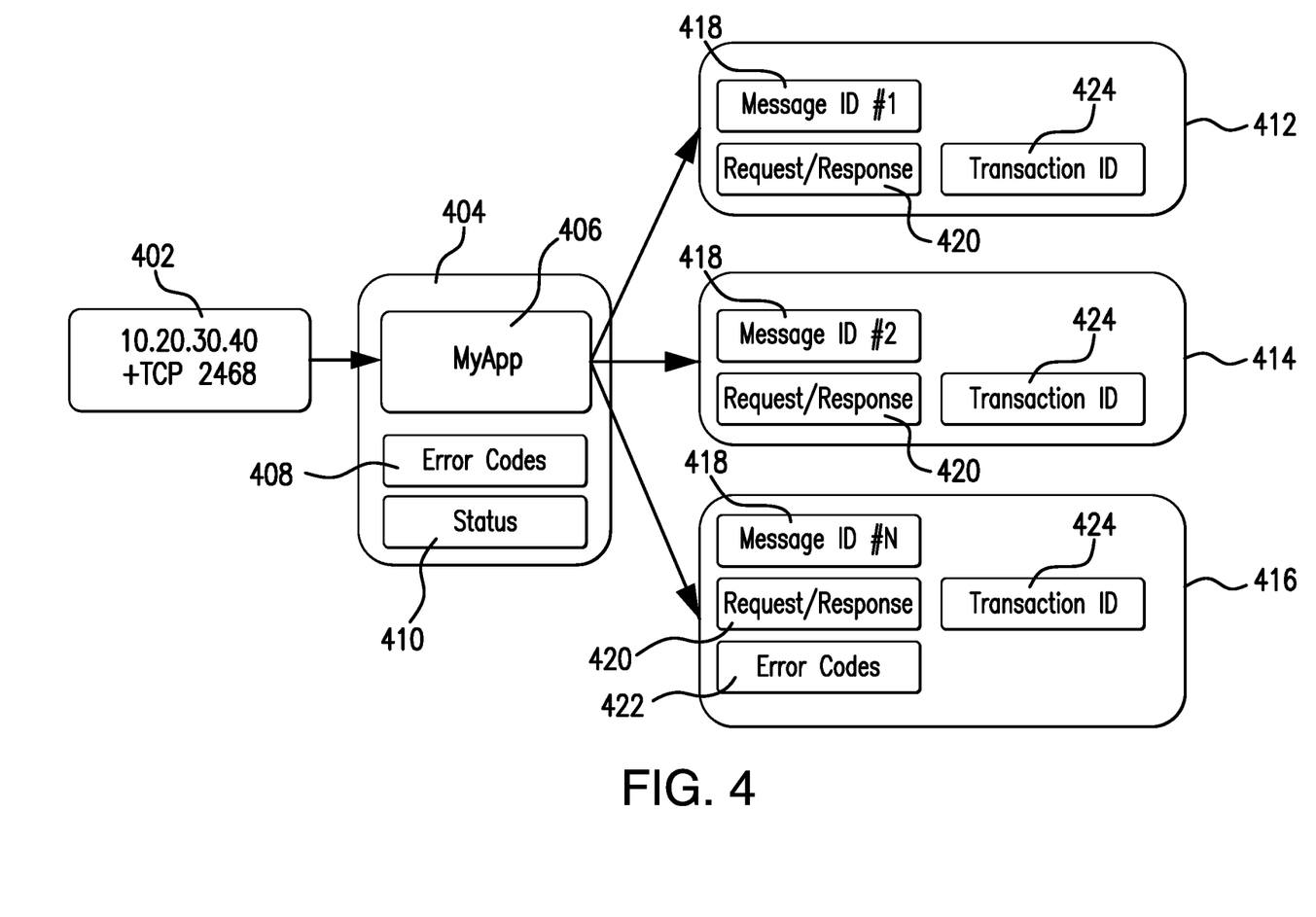
FIG. 4 illustrates a block diagram of an application configuration process, in accordance with an embodiment of the present invention.

Referring now to FIG. 4, there is shown a block diagram of an application configuration process, in accordance with an embodiment of the present invention. As shown in FIG. 4, for each application defined by an application definition 402, the ASI extender 214 maintains a data structure 404 for storing data related to the monitored application of interest. In an example embodiment, such stored data may include application name 406, application error codes 408 and application status 410. Further, each transaction associated with a monitored application may optionally be characterized as either being successful or unsuccessful. Consider that if a transaction fails, an error code may identify the type of error that has caused the transaction to be unsuccessful. Further, the stored data may include a precision timer (not shown), which allows the ASI extender 214 to determine the time taken for a transaction to complete. If a monitored customized application has multiple transactions, all of them typically share same error codes, which are configured by a user. Optionally, additional error codes can be added at each transactional level, as discussed below. Each error code 408 may be associated with a particular definition, description, offset, length, format, or any other transaction error related data. Furthermore, at least some error codes 408 may be indicative of a transaction status. Each status 410 may be associated with either a transaction success, failure or a particular type of information. A failure associated with the transaction may be detected by the ASI extender 214 from an error code that was included in a response to an original transactional request. The failure may be further analyzed by the ASI extender 214 or a separate module to determine a recovery action (such as a triggered alarm) by mapping the failure to the recovery action. According to an embodiment of the present invention, informational error codes may not necessarily indicate a failure but might still be important to track by the ASI extender 214.

As shown in FIG. 4, in addition to the application definition 402, users also configure a plurality of transaction types. Each transaction type may be stored as a separate entry 412-416 in the data structure associated with the monitored application 406. Each message, as referred to hereinafter, is a unique message within the customized application 406. The ASI extender 214 is configured to keep track of transaction performance metrics related to number of transactions, transaction responsiveness, status (conditions) and error codes. According to an embodiment of the present invention, each error code can be mapped to one particular message. Such a mapping may be implemented as a one-to-many relationship between transaction parameters (e.g., error code) and a transaction. In other words, in this implementation, the same error code associated with different message can have different meaning and different description. The step of obtaining accurate transaction information (302) for a customized application enables the ASI extender 214 to track application's internal operation and provide users accurate status/error conditions at transactional level.

Figure 5:
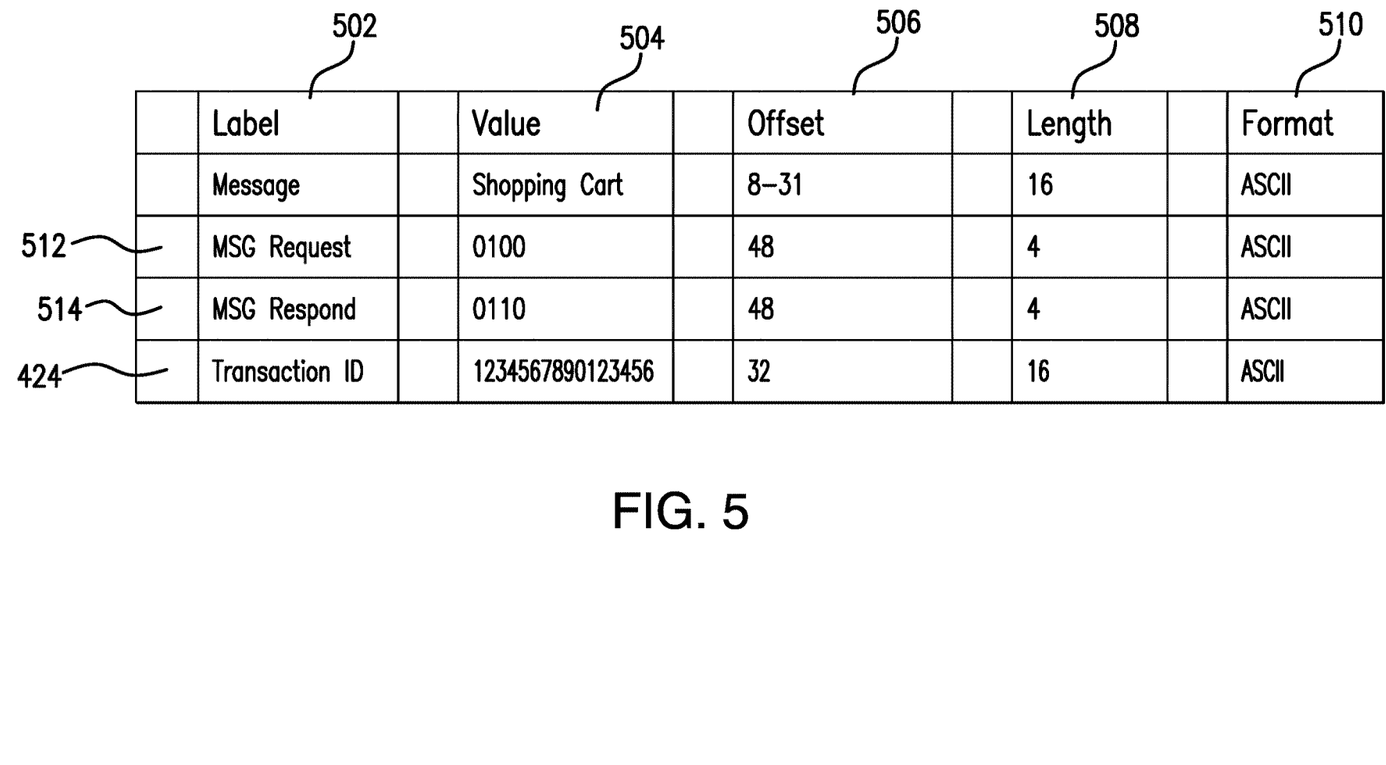
FIG. 5 is a table showing the sample message provisioning data fields in accordance with an illustrative embodiment of the present invention.

In an embodiment of the present invention, transaction information collected and stored by the ASI extender 214 in transaction type entries 412-416 includes message identifiers 418, matching request/response pair information 420 for each transaction and any additional error codes 422 (if different from Application error codes). FIG. 5 is a table showing the sample message provisioning data fields that can collectively be stored as message identifiers in accordance with an illustrative embodiment of the present invention. As shown in FIG. 5, stored message information may include definition 502, value 504, offset 506, length 508 and format 510 values. Message data format 510 may include decimal, ASCII, Binary, EBCDIC, HEX, and the like. During analysis of the data, messages encoded in non-ASCII formats, such as EBCDIC may be converted to ASCII for processing by the ASI extender 214. It should be noted that the term "transaction" as used throughout this application refers generally to a corresponding pair of request/response messages. Accordingly, in some examples, all transaction type entries 412-416 include both the request message information 512 and response message information 514. In some embodiments, a sequence number or a message serial number may be used to match corresponding request and response messages. Transaction ID information 424 can be a unique sequence number or a unique transaction identification string to identify a particular transaction for a particular message ID. The transaction ID 424 is used by the ASI extender 214 to correlate transactions and enables records correlation across multiple monitoring points. If a transaction ID does not exist for a particular application transaction, that specific transaction is treated as a single threaded transaction by the ASI extender 214. In other words, the ASI extender 214 can determine the start/end of a transaction without a transaction ID based on a request/response messages alone. It should be noted that in various embodiments, the ASI extender 214 may be configured to support both interactive messages (having request/response pairs) and non-interactive messages, (e.g., messages for which no response is expected). For non-interactive messages, information stored by the ASI extender 214 may also include definition 502, offset 506, length 508 and format 510 values.

At least in some embodiments of the present invention, the information related to a customized application and obtained by the ASI extender 214 in step 302 may be indicative of customized application's payload fragmentation support. If the customized application provides support for handling payload fragmentation, each bulk message can be split into multiple packets. In this case, the ASI extender 214 individually tracks each packet. In various embodiments, multiple packets within each bulk message can have fixed length or can be separated by either or both of a message delimiter and one or more special characters. The obtained customized application information typically indicates a maximum number of packets included in each message. It should be further noted that if a particular protocol utilized by a customized application supports multiple sub applications sharing the same IP address/port number, the information obtained by the ASI extender 214 should include the offset and the length of the sub message differentiator.

Referring back to FIG. 3, at step 304, the ASI extender 214 utilizes the information received at step 302 to generate a template for the customized application to be monitored. In one embodiment, the generated template may comprise an XML document. Below is an example template that may be used by the ASI extender 214 to monitor and parse Dynamic Host Configuration Protocol (DHCP) messages in a network. The example tags in the XML document below are illustrative and may not correspond to a specific document XML format:

```
<?xml version="1.0" encoding="UTF-8"?>
<asi_template>
   <header>
      <area_id> 55 </area_id>
      <version>1</version>
      <description>ASI template</description>
   </header>
      <template>
   <!--this is where the ASI extender 214 associates this template with particular
applications. There can as many apps as needed here -->
         <local_index> 0x382c352 </local_index>
         <local_index> 0x382c353 </local_index>
         <!-- data format can be "ascii" or "binary"-->
         <data_format> ascii </data_format>
   <!--this is where the offset of the message information is given -->
         <request_type_size> 1 </request_type_size>
         <request_type_offset> 242 </request_type_offset>
         <request_pair>
   <!—for DHCP this indicates that message 1 is a request and the reply is message 2, these
will be paired to calculate response time. These are the Discover and Offer messages
in DHCP -->
         <request_type> 1 </request_type>
         <reply_type> 2 </reply_type>
         </request_pair>
         <request_pair>
   <!--for DHCP this indicates that message 3 and message 5 will be paired to calculate
response time. These are Request and ACK -->
         <request_type> 3 </request_type>
         <reply_type> 5 </reply_type>
         </request_pair>
   <!--indicates the offset and size of the error code field -->
         <error_code_size> 1 </error_code_size>
         <error_code_offset> 242 </error_code_offset>
```

```
            <error_codes>
                <!--here the error codes are indicated. There can be one to many here-->
                <error_code> 4 </error_code>
                <error_code> 6 </error_code>
            </error_codes>
    <!-- indicates if there is an ID number that matches the request and response packets and
the length and offset of that ID -->
            <request_id>
                <use_request_id> yes </use_request_id>
                <request_id_size> 4 </request_id_size>
            <request_id_offset> 4 </request_id_offset>
            </request_id>
    <!—used to differentiate different applications that are on the same IP address/port pair.
DHCP does not have any sub apps -->
        <sub_app_id>
                <sub_app_id_offset> 0</ sub_app_id_offset>
                <sub_app_id_len> 0</sub_app_id_len>
        <sub_app_id>
    </template>
    <template>
        <!—some other template would go here-->
    </template>
</asi_template>
```

Next, according to one embodiment of the present invention, at step 306, the ASI extender 214 utilizes the generated template to monitor performance of the customized application. As described above, the generated template includes protocol configuration information, such as, but not limited to, offsets, request message information and response message information. While the above discussion uses XML files as an example, various embodiments of the invention are not so limited as other methods of communicating protocol configuration information are contemplated as being able to be utilized by the ASI extender 214. The ASI extender 214 may store the protocol configuration information in the primary memory 206 for data packet processing and parsing. For example, the ASI extender 214 uses these offsets to match the request and response message packets and to extract the ASI data from the processed packets.

More specifically, at step 308, the ASI extender 214 measures performance of one or more customized application's transactions. For instance, the ASI extender 214 may parse the protocol information retrieved at step 308 to obtain response time based on the request/response message pair information. In addition, the ASI extender 214 may obtain, store, analyze and present to a user the error codes captured within the analyzed transaction messages. Thus, in one embodiment the performance may be calculated as the actual response time of a transaction, while in an alternative embodiment, the performance may comprise issue of an error code in the transaction's response message. At least in some embodiments, the ASI extender 214 may also apply the error codes captured in a particular transaction to derive application's/transaction's status.

At step 310, the ASI extender 214 may optionally extract certain specified fields from transactions and copy them to special storage regions in the secondary memory 208. In one embodiment, the ASI data collected by the ASI extender 214 may include Adaptive Session Records (ASR) data. The ASR data focuses on a single session and collects substantially all events, performance metrics, and error codes for the entire duration of the session. At least in some embodiments, the ASR data can be mined by the ASI extender 214 and may be presented as part of the session analysis. In order to extract one or more fields, the ASI extender 214 may collect information related to data field descriptions, length, data field format, offset definitions and whether the field is included in data request or data response packets. As a non-limiting example, in financial applications related to stock and commodity exchanges, users may specify the location (offset) of the stock Id and the amount fields to be extracted by the ASI extender 214 from the captured payload information and to be included in the stored ASR data using the payload data field identifier configurations provided in an application definition. This optional step enables users not only to see the ASI data (such as a response time and error codes) for a particular transaction but to drill down to one or more sessions associated with the particular transaction and to see the specified ASR data (such as a stockId).

Advantageously, the various embodiments described herein provide more efficient monitoring and troubleshooting process, at transaction level, in various computer networks that incorporate proprietary, fixed format, protocols. In the aforementioned embodiments, to provide customized application insights, the plurality of monitoring devices utilizes an Adaptive Service Intelligence (ASI) extender for storage and processing. The ASI data set comprises highly scalable metadata that enables a comprehensive real-time and historic view of service, network, application, and server performance. Furthermore, the automated system disclosed herein is preferably configured to extract certain specified fields from the analyzed transactions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for monitoring performance of customized applications at transaction level in a computer network, the method comprising:
   receiving from a user, by a processor, information related to a customized application, the received information comprising at least application definition and information related to customized application protocol;
   generating, by a processor, a template for the customized application based on the received information;
   receiving from a network interface transactional data packets associated with the customized application;
   sending a first copy of the received transactional data packets to a first memory device;
   generating Adaptive Session Intelligence (ASI) data sets from the received transactional data packets in an ASI extender associated with the first memory device wherein the ASI extender is configured to determine a start/end of a transaction without a transaction ID based on request/response messages;
   storing the ASI data sets in the first memory device;
   sending a second copy of the received transactional data packets to a second memory device to monitor, by a processor, performance of the customized application, at transaction level, using the generated template by analyzing received transactional data packets associated with the customized application to at least determine a status of the customized application;
   determining a failure of the customized application at transaction level utilizing the AS data sets; and
   determining a recovery action for the determined failure of the customized application by mapping the failure to a recovery action.

2. The method of claim 1, wherein the customized application protocol comprises a fixed format protocol in which each transaction type has a fixed transaction length and a fixed offset.

3. The method of claim 1, wherein the application definition includes an Internet Protocol (IP) address, a port number and a global application identification string of the customized application.

4. The method of claim 2, wherein the fixed format protocol comprises a TCP/IP protocol or a UDP/IP protocol.

5. The method of claim 1, wherein monitoring performance of the customized application at transaction level further comprises collecting, by a processor, at least a portion of performance metrics associated with each customized application's transaction.

6. The method of claim 1, wherein the application definition further includes information related to one or more transaction states of the customized application.

7. The method of claim 1, wherein the information related to the customized application protocol further comprises transaction definitions uniquely identifying one of a plurality of transactions.

8. The method of claim 2, wherein at least some transactions in the fixed format protocol are associated with more than one transaction packets.

9. The method of claim 1, wherein the generated template comprises an XML document.

10. The method of claim 5, wherein the customized application's transaction is associated with a request message and a response message.

11. The method of claim 5, wherein the collected performance metric represents a transaction response time.

12. The method of claim 5, wherein the collected performance metric represents a transaction error code.

13. The method of claim 2, further comprising extracting contents of one or more payload fields from the monitored transaction using the fixed protocol based on a user specified offset of the one or more payload fields.

14. A non-transitory computer readable storage medium structured to store instructions, the instructions when executed, cause a processor in a network device for monitoring performance of customized applications to:
   receive, from a user, information related to a customized application, the received information comprising at least application definition and information related to customized application protocol;
   generate a template for the customized application based on the received information;
   receive from a network interface transactional data packets associated with the customized application;
   send a first copy of the received transactional data packets to a first memory device;
   generate Adaptive Session Intelligence (ASI) data sets from the received transactional data packets in an ASI extender associated with the first memory device wherein the ASI extender is configured to determine a start/end of a transaction without a transaction ID based on request/response messages;
   store the ASI data sets in the first memory device;
   send a second copy of the received transactional data packets to a second memory device to monitor performance of the customized application at transaction level using the generated template by analyzing received transactional data packets associated with the customized application to at least determine a status of the customized application;
   determine a failure of the customized application at transaction level utilizing the ASI data sets;
   determine a recovery action for the determined failure of the customized application by mapping the failure to a recovery action.

15. The non-transitory computer readable storage medium as recited in claim 14 wherein the generated ASI data sets include data associated with: service and user-related metrics on network devices, network subscribers, one or more network base station IDs, one or more Access Point Names (APN), Tracking Area Code (TAC) information and VLAN information.

16. The non-transitory computer readable storage medium as recited in claim 14 wherein generated ASI data sets related to one or more transactions are stored in memory for a longer time than generated ASI data sets not related to one or more transactions.

17. The method as recited in claim 1 wherein the generated ASI data sets include data associated with: service and user-related metrics on network devices, network subscribers, one or more network base station IDs, one or more Access Point Names (APN), Tracking Area Code (TAC) information and VLAN information.

18. The method as recited in claim 1 wherein generated ASI data sets related to one or more transactions are stored in memory for a longer time than generated ASI data sets not related to one or more transactions.

* * * * *